(12) United States Patent
Mukai et al.

(10) Patent No.: US 8,659,260 B2
(45) Date of Patent: Feb. 25, 2014

(54) MOTOR DRIVE APPARATUS AND ELECTRIC POWER STEERING APPARATUS USING THE SAME

(75) Inventors: Yasuhiko Mukai, Kariya (JP);
Nobuhiko Uryu, Kariya (JP)

(73) Assignee: Denso Corporation, Kariya (JP)

( * ) Notice: Subject to any disclaimer, the term of this patent is extended or adjusted under 35 U.S.C. 154(b) by 424 days.

(21) Appl. No.: 13/020,224

(22) Filed: Feb. 3, 2011

(65) Prior Publication Data
US 2011/0204839 A1 Aug. 25, 2011

(30) Foreign Application Priority Data

Feb. 23, 2010 (JP) .................................. 2010-37153

(51) Int. Cl.
*H02P 27/04* (2006.01)
(52) U.S. Cl.
USPC . 318/801; 318/139; 318/400.02; 318/400.21; 318/400.22; 318/445; 180/6.28; 180/6.5
(58) Field of Classification Search
USPC .......... 318/801, 139, 400.02, 400.21, 400.22, 318/445; 180/6.28, 6.5
See application file for complete search history.

(56) References Cited

U.S. PATENT DOCUMENTS

| | | | | |
|---|---|---|---|---|
| 5,414,339 | A | * | 5/1995 | Masaki et al. ................. 318/800 |
| 5,969,919 | A | * | 10/1999 | Kobayashi et al. ............. 361/23 |
| 7,207,412 | B2 | | 4/2007 | Uryu |
| 7,277,304 | B2 | * | 10/2007 | Stancu et al. ................... 363/71 |
| 7,977,963 | B2 | * | 7/2011 | Bae et al. ................. 324/764.01 |
| 2009/0302792 | A1 | | 12/2009 | Osada et al. |
| 2010/0017063 | A1 | | 1/2010 | Maeda |

FOREIGN PATENT DOCUMENTS

| | | |
|---|---|---|
| JP | H4-365770 | 12/1992 |
| JP | H05-010859 | 1/1993 |
| JP | 7-033033 | 2/1995 |
| JP | H8-294202 | 11/1996 |
| JP | P2006-320176 A | 11/2006 |

OTHER PUBLICATIONS

Japanese Office Action dated Feb. 3, 2012, issued in corresponding Japanese Application No. 2010-037153 with English Translation.

* cited by examiner

*Primary Examiner* — Erick Glass
(74) *Attorney, Agent, or Firm* — Nixon & Vanderhye PC (57) ABSTRACT

A motor drive apparatus has a plurality of motor drive parts and a control unit. The control unit performs first and second failure detection processing for the motor drive parts before starting to drive the motor. If the first motor drive part is determined to have failure by the first failure detection processing, a first power supply relay for the first motor drive part is turned off and the second failure detection processing for the first motor drive part is inhibited. If the second motor drive part is determined to have no failure by the first failure detection processing and then by the second failure detection processing, the motor is started to operate.

8 Claims, 6 Drawing Sheets

MOTOR DRIVE APPARATUS AND ELECTRIC POWER STEERING APPARATUS USING THE SAME

CROSS REFERENCE TO RELATED APPLICATION

This application is based on and incorporates herein by reference Japanese patent application No. 2010-37153 filed on Feb. 23, 2010.

FIELD OF THE INVENTION

The present invention relates to a motor drive apparatus, which has a plurality of motor drive parts, and an electric power steering apparatus using the same.

BACKGROUND OF THE INVENTION

Some conventional motor drive apparatuses have a plurality of motor drive parts. According to an electric motor drive apparatus disclosed in the following patent document 1, for example, a motor driver and a motor winding form a motor drive part and two motor drive parts are provided. Thus, the motor is operated to generate drive force, whichever winding of the motor drive part is energized.

According an electric power steering apparatus disclosed in the following patent document 2, when failure occurs in one of three-phase windings of a three-phase brushless motor, the motor is operated by energizing the remaining two of the three-phase windings, which are normal.

Patent document 1: JP H7-33033
Patent document 2: JP 2009-6963 (US 2010/0017063A)

In case of generating large rotational torque by arranging a plurality of motor drive parts in the motor drive apparatus of patent document 1, a large current need be supplied to the motor. The motor drive parts therefore are required to control large currents. If certain failure occurs in the motor drive apparatus for some reasons, a large current will unexpectedly flow. It is therefore general practice to start driving the motor after checking for any failure in each of the motor drive parts.

In case of generating rotary force from the motor by using only two phases in the motor drive apparatus of patent document 2, a failure portion in the motor drive parts need be specified before driving the motor. It is also required to check whether any other failure is present after specifying the failure portion. Thus, the failure detection processing, which is performed before starting to drive the motor, is complicated. If such complicated failure detection processing is used in a motor drive apparatus having a plurality of motor drive parts, a large and expensive microcomputer will be required to perform the complicated failure detection method a number of times.

SUMMARY OF THE INVENTION

It is therefore an object of the present invention to provide a motor drive apparatus, which is compact, low in cost and high in reliability, by simplifying failure detection processing performed before starting to drive a motor.

It is also an object of the present invention to provide an electric power steering apparatus, which uses the motor drive apparatus.

According to the present invention, a motor drive apparatus is provided for a motor which is driven by electric power supplied from a DC power source. The motor drive apparatus comprises a plurality of motor drive parts, a control unit and a power interruption section. The plurality of motor drive parts is formed of a plurality of inverters and a plurality of winding sets, respectively. Each inverter is for converting the electric power of the DC power source into AC power, and each winding set is for driving the motor with the AC power supplied from the inverter. The control unit is configured to perform a plurality of ("m": integer equal to 2 or more) failure detection processing with respect to each of the plurality of motor drive parts in an order from first to "m"-th failure detection processing before starting to drive the motor. The control unit is configured to control power supply to the motor drive part by determining failure or no-failure in the motor drive part by the plurality of failure detection processing. The power interruption section is provided to supply or interrupt the electric power from the DC power source to the plurality of motor drive parts. The power interruption section is configured to interrupt, when the control unit determines that a specific one of the motor drive parts has failure, the electric power from being supplied from the DC power source to the specific one of the motor drive parts. The control unit is configured to inhibit execution of next one of the plurality of failure detection processing for the specified one of the motor drive parts after determination of the failure.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to the accompanying drawings, which show an example of a motor drive apparatus provided in an electric power steering apparatus for assisting steering operation in a vehicle.

Figure 1:
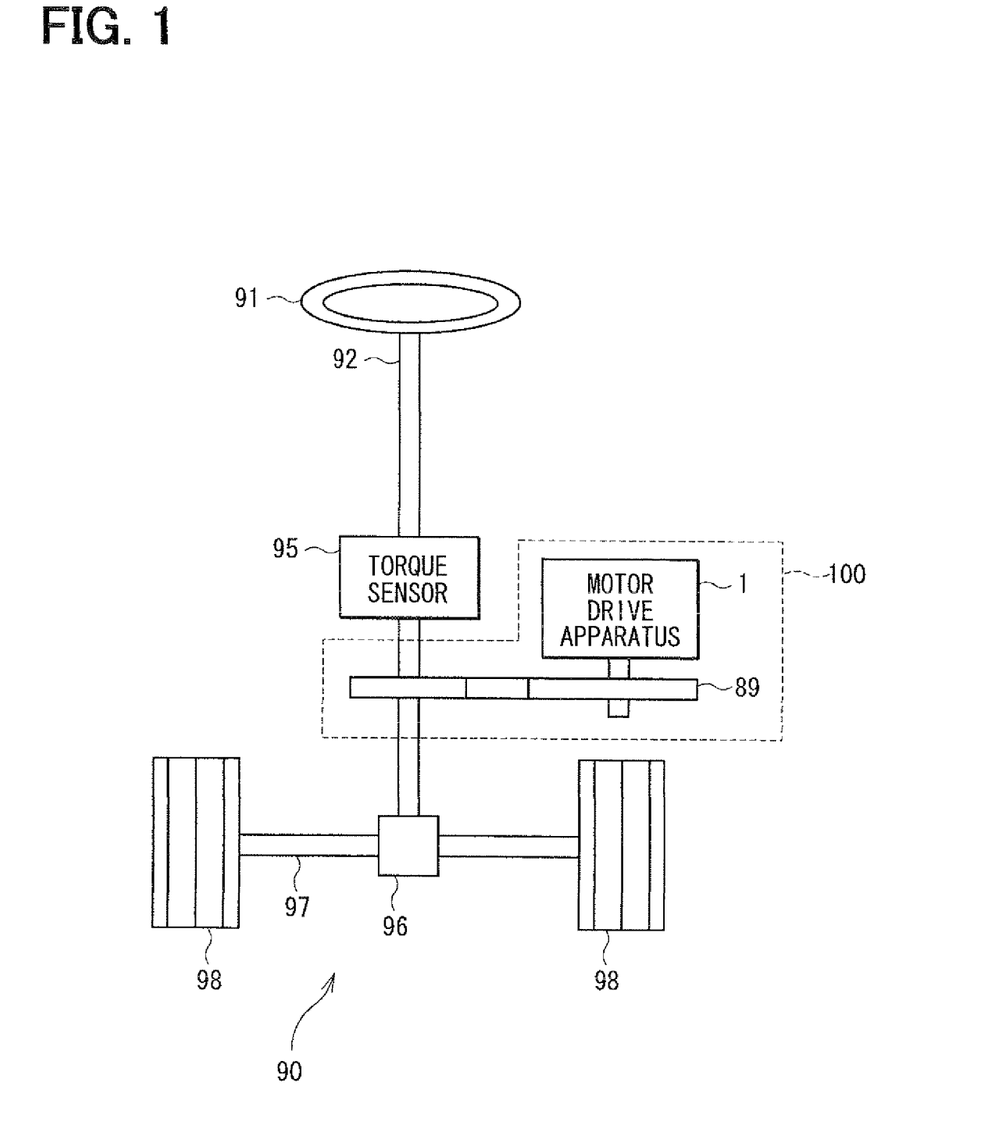
FIG. 1 is a schematic illustration of an electric power steering apparatus using a motor drive apparatus according to the present invention.

As shown in FIG. 1, a steering apparatus 90 includes an electric power steering apparatus 100. A torque sensor 95 is attached to a steering shaft 92, which is coupled to a steering wheel 91, for detecting a steering torque. A pinion gear 96 is provided on one longitudinal end of the steering shaft 92 and in engagement with a rack shaft 97. A pair of tire wheels 98 are coupled to both ends of the rack shaft 97 through tie rods, etc. The tire wheels 98 are rotatable.

When the steering wheel 91 is rotated by a driver, the rotary motion of the steering shaft 92 is translated into a linear motion of the rack shaft 97 by the pinion gear 96. The pair of tire wheels 98 is steered by an angle, which corresponds to a change in the linear motion of the rack shaft 97.

The electric power steering apparatus 100 includes a motor drive apparatus 1 and a reduction gear 89. The motor drive apparatus 1 includes an electric motor 10 (FIG. 2), which generates steering assist torque, and other components such as a rotation angle sensor for detecting the angular position of the motor 10. The reduction gear 89 is for transferring the torque of the motor 10 to the steering shaft 92 by speed-reducing the rotation of the motor 10. The motor 10 is a three-phase brushless motor 80 and configured to rotate the reduction gear 89 in the forward or rearward direction. With this configuration, the electric power steering apparatus 100 generates the steering assist torque in the steering direction and steering torque of the steering wheel 91 and transfers it to the steering shaft 92 thereby to power-assist steering of the steering wheel 91.

Figure 2:
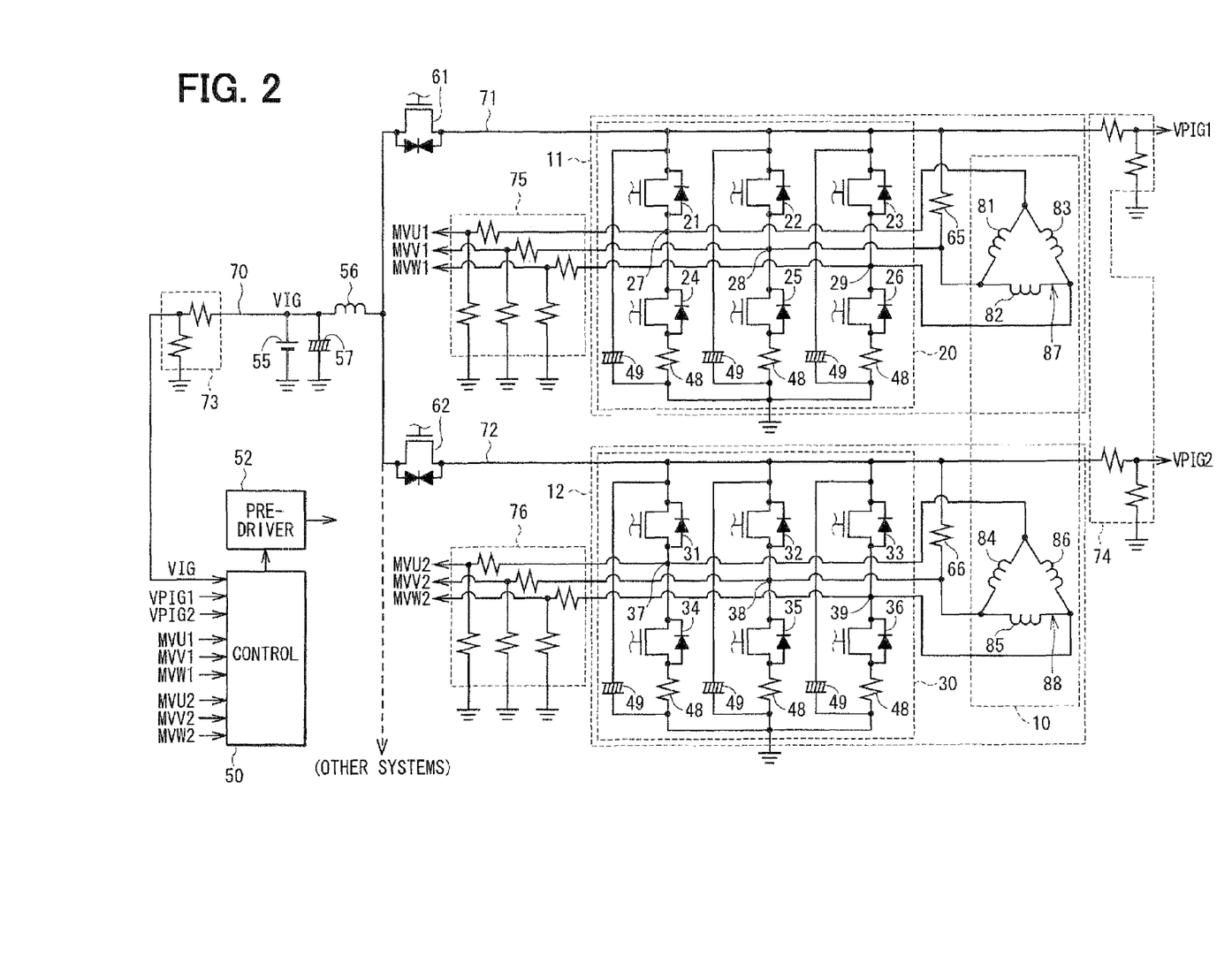
FIG. 2 is a circuit diagram of the motor drive apparatus shown in FIG. 1.

The motor drive apparatus 1, which is provided with a plurality of motor drive parts, is configured as shown in FIG. 2. In this example, the motor drive apparatus 1 is provided with two drive systems, that is, a first drive system and a second drive system, which are provided in parallel and include a first drive part and a second drive part, respectively. Same or similar components in the first and the second drive systems are similarly distinguished by "first" and "second" from each other. In case that three or more drive systems are provided, the same or similar arrangements are provided in parallel.

The motor drive apparatus 1 includes a DC power source 55, a first power supply relay 61, a second power supply relay 62, a first motor drive part 11, a second motor drive part 12, a control unit 50 and the like. The first power supply relay 61 and the second power supply relay 62 operate as electric power interruption sections, respectively. The first motor drive part 11 and the second motor drive part 12 operates as motor drive parts, respectively.

The DC power source 55 supplies the motor drive apparatus 1 with DC electric power. The electric power supplied from the DC power source 55 is supplied to a first power supply line 71 through a filter circuit, which is formed of a choke coil 56 and a smoothing capacitor 57, and the first power supply relay 61. The first power supply line 71 extends from an output of the first power supply relay 61. The first motor drive part 11 is connected to the first power supply line 71. The filter circuit is provided to suppress noises generated by the operation of the motor drive parts 11 and 12 from being transmitted to other devices, which are also supplied electric power from the same DC power source 55. The electric power supplied from the DC power source 55 is also supplied to a second power supply line 72 through the filter circuit and the second power supply relay 62. The second power supply line 72 extends from an output of the second relay 61. The second motor drive part is connected to the second power supply line 72.

The first power supply relay 61 is turned off immediately by the control unit 50, when the control unit 50 detects failure (abnormality) in the first motor drive part 11 by its failure check processing. The power supply from the DC power source 55 to the first motor drive part 11 is thus interrupted by the first power supply relay 61. The second power supply relay 62 is turned off immediately by the control unit 50, when the control unit 50 detects failure (abnormality) in the second motor drive part 12 by its failure check processing. The power supply from the DC power source 55 to the second motor drive part 12 is thus interrupted by the second power supply relay 62.

The first motor drive part 11 and the second motor drive part 12 drive the motor 10 by electric power supplied from the DC power source 55. The first motor drive part 11 includes a first inverter 20, a first winding set 87 and a first pull-up resistor 65, which connects the first winding set 87 to the first power supply line 71 for voltage application to the first winding set 87. The second motor drive part 12 includes a second inverter 30, a second winding set 88 and a second pull-up resistor 66, which connects the second winding set 88 to the second power supply line 72 for voltage application to the second winding set 88. The first inverter 20 and the second inverter 30 operate as an inverter part. The first winding set 87 and the second winding set 88 operate as a winding set.

The first motor drive part 11 and the second motor drive part 12 have thus the same configuration. The detailed description will therefore be made with reference to the first motor drive part 11 as an example.

The first inverter 20 is a voltage-type PWM inverter, which includes high-side (power source-side) FETs 21 to 23 and a low-side (ground-side) FETs 24 to 26. The FETs 21 to 26 are switching elements. The electric power is supplied from the DC power source 55 to the first inverter 20 through the first power supply line 71.

The high-side FETs 21 to 23 have respective drains connected to the first power supply line 71 and respective sources connected to drains of the low-side FETs 24 to 26. The low-side FETs 24 to 26 have respective sources and are grounded through shunt resistors 48, which form a current detection section, for detecting phase currents flowing to a U1 coil 81, a V1 coil 82 and a W1 coil 83 of the first winding set 87, respectively.

It is assumed here that the three phases are a U-phase, a V-phase and a W-phase. In the U-phase, the source of the high-side FET 21 and the drain of the low-side FET 24 are connected to a U1 terminal 27. The U1 terminal 27 is connected to one end of the U1 coil 81. In the V-phase, the source of the high-side FET 22 and the drain of the low-side FET 25 are connected to a V1 terminal 28. The V1 terminal 28 is connected to one end of the V1 coil 82. In the W-phase, the source of the high-side FET 23 and the drain of the low-side FET 26 are connected to a W1 terminal 29. The W1 terminal 29 is connected to one end of the W1 coil 83.

In the second inverter 30 of the second motor drive part 12, high-side FETs 31 to 33, low-side FETs 34 to 36 and terminals 37 to 39 correspond to the high-side FETs 21 to 23, the low-side FETs 24 to 26 and the terminals 27 to 29 of the first inverter 20, respectively.

An electrolytic capacitor 49 is connected between the power supply line 71 and the ground in parallel to the series connection of the high-side FET, the low-side FET and the resistor 48 in each phase. The capacitor 49 is an aluminum electrolytic capacitor, which is provided to store electric charge and supplement supply of electric power to the FETs 21 to 26. It also removes noise components such as surge currents.

The pull-up resistor 65 applies a power supply voltage to the first winding set 87 independently of the first inverter 20. The pull-up resistor 65 is connected to the power supply line 71 at its one end and connected to the terminals 27 to 29 at its other end through the first winding set 87.

The motor 10 has magnetic poles on the rotor side and two three-phase winding sets on the stator side. One of the two three-phase winding sets includes the U1 coil 81, the V1 coil 82 and the W1 coil 83. The other of the two winding sets includes the U2 coil 84, the V2 coil 85 and the W2 coil 86. For example, the U1 coil indicates a winding of the U-phase of the first power supply system. The U1 coil 81, the V1 coil 82 and the W1 coil 83 form the first winding set 87. The U2 coil 84, the V2 coil 85 and the W2 coil 86 form the second winding set 88. Each of the first winding set 87 and the second winding set 88 is configured in a delta shape.

The control unit 50 is an electronic control unit including a microcomputer, which is programmed to control entire operation of the motor drive apparatus 1. The control unit 50 is connected to a pre-driver 52. The pre-driver 52 is formed of a charge pump circuit. The pre-driver 52 is connected to gates of the FETs 21 to 26 of the first inverter 20 and gates of the FETs 31 to 36 of the second inverter 30. The pre-driver 52 is connected also to gates of the first power supply relay 61 and the second power supply relay 62. Signal lines, which apply control signals from the pre-driver 52 to the FETs 21 to 26, the FETs 31 to 36 and the relays 61, 62, are not shown in FIG. 2 for simplicity.

The control unit 50 determines the control signals based on a rotational position of the rotor of the motor 10 detected by a rotation angle sensor and phase currents detected by the resistors 48. The control unit 50 applies the control signals to the gates of the FETs 21 to 26 of the first inverter 20 through the pre-driver 52 so that the first inverter 20 starts to supply electric power to the first winding set 87. The control unit 50 also applies control signals to the gates of the FETs 31 to 36 of the second inverter 30 through the pre-driver 52 so that the second inverter 30 starts to supply electric power to the second winding set 88. The motor 10 is started to be driven by the first motor drive part 11 and the second motor drive part 12 as described above.

The control unit 50 is configured to detect a power supply line voltage VIG, a first relay output power voltage VPIG1, a second relay output power voltage VPIG and terminal voltages MV as described below.

(1) A power supply line 70 extends from the DC power source 55 and is connected to an A/D conversion section (not shown) provided in the control unit 50 through an interface circuit 73. The control unit 50 thus receives and detects the power supply line voltage VIG through the interface circuit 73.

(2) The first power supply line 71 and the second power supply line 72 are also connected to the A/D conversion section of the control unit 50 through an interface circuit 74. The control unit 50 thus detects the first relay output power voltage (first power supply line voltage) VPIG1 and the second relay output power voltage (second power supply line voltage) VPIG2 through the interface circuit 74.

(3) The U1 terminal 27, the V1 terminal 28 and the W1 terminal 29 are also connected to the A/D conversion section of the control unit 50 through an interface circuit 75. The control unit 50 thus receives and detects the U1 terminal voltage MVU1, which is developed between the U1 terminal 27 and the ground, the V1 terminal voltage MVV1, which is developed between the V1 terminal 28 and the ground, and the W1 terminal voltage MVW1, which is developed between the W1 terminal 29 and the ground, through the interface circuit 75.

(4) Similarly, the control unit 50 detects the U2 terminal voltage MVU2, the V2 terminal voltage MW2 and the W2 terminal voltage MVW2 through an interface circuit 76.

The control unit 50 checks, before starting to control the motor 10 by the motor drive parts 11 and 12, whether any failure is present in the first motor drive part 11 and the second motor drive part 12 based on voltages detected through the interface circuits 73, 74, 75 and 76. The control unit 50 is configured to execute a plurality of (as many as "m") different failure check processing, which includes first failure detection processing and second failure detection processing, for example, for each of the motor drive parts. "m" is an integer, which is 2 or more. In case of "m" being 2, the second failure detection processing is executed only when it is determined that the checked drive part is normal (that is, no failure) by the first failure detection processing. The first failure detection processing and the second failure detection processing are referred to as processing A and processing B, respectively.

The failure detection processing A (first failure detection processing) and the failure detection processing B (second failure detection processing) will be described in more detail below by referring to the processing executed with respect to the first motor drive part 11 as an example. It is noted that the similar processing is executed also with respect to the second motor drive part 12. The similar processing is executed further by other motor drive parts, which are provided in addition to the first and the second motor drive parts 11 and 12.

Figure 3:
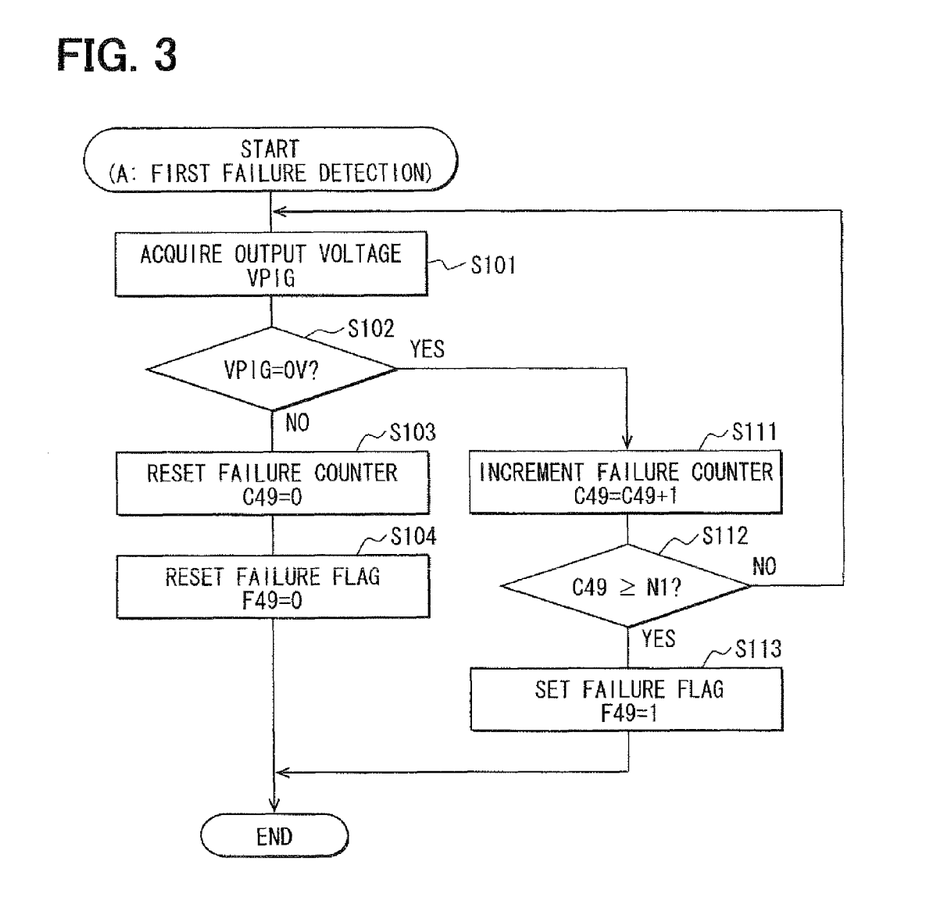
FIG. 3 is a flowchart showing first failure detection processing executed by the motor drive apparatus shown in FIG. 2.

The failure detection processing A is shown as a flowchart in FIG. 3, in which S denotes a step. In this processing A, short-circuit failure of each electrolytic capacitor 49 is detected. If the electrolytic capacitor 49 short-circuits, a large current flows from the power supply voltage side (power supply line 71) to the ground. Therefore, the large current need be prevented from flowing.

When any one of the electrolytic capacitors 49 is in the short-circuit failure, the first power supply line 71 is grounded and its output voltage VPIG1 falls to 0. The failure detection processing A therefore detects the failure of the electrolytic capacitor 49 by checking the output voltage VPIG1.

Referring to FIG. 3, first at S101, the first power supply line output voltage VPIG1, which corresponds to the voltage of the electrolytic capacitor 49, is acquired. At S102, it is checked whether the acquired output voltage VPIG1 is 0V. This checking may be made as to whether the output voltage VPIG1 is close to 0. If the determination is NO, a failure counter is reset (C49=0) at S103 and S104 is then executed. The count C49 is used to indicate the number of times of determination of the short-circuit failure. The count C49 thus increases as the short-circuit failure persists. At S104, an electrolytic capacitor failure flag is reset (F49=0). Thus, it is determined that the electrolytic capacitor 49 is normal and has no short-circuit failure.

If the determination at S102 is YES, the failure counter is incremented (C49=C49+1) at S111 and S112 is executed. At S112, it is checked whether the count C49 of the failure counter is equal to or greater than a predetermined count N1. If the determination is NO, the above processing is repeated again from S101. The determination of NO at S112 indicates that the detected failure may be just temporary. Thus erroneous determination is prevented from being caused by accidental drop of the output voltage VIPG1. If the determination is YES as many as N1 or more times at S102, the check at S112 results in YES. In this case, the failure flag F49 is set (F49=1) to indicate that the electrolytic capacitor 49 is finally determined to be in failure. After S104 or S113, the failure detection processing A is finished.

Figure 4:
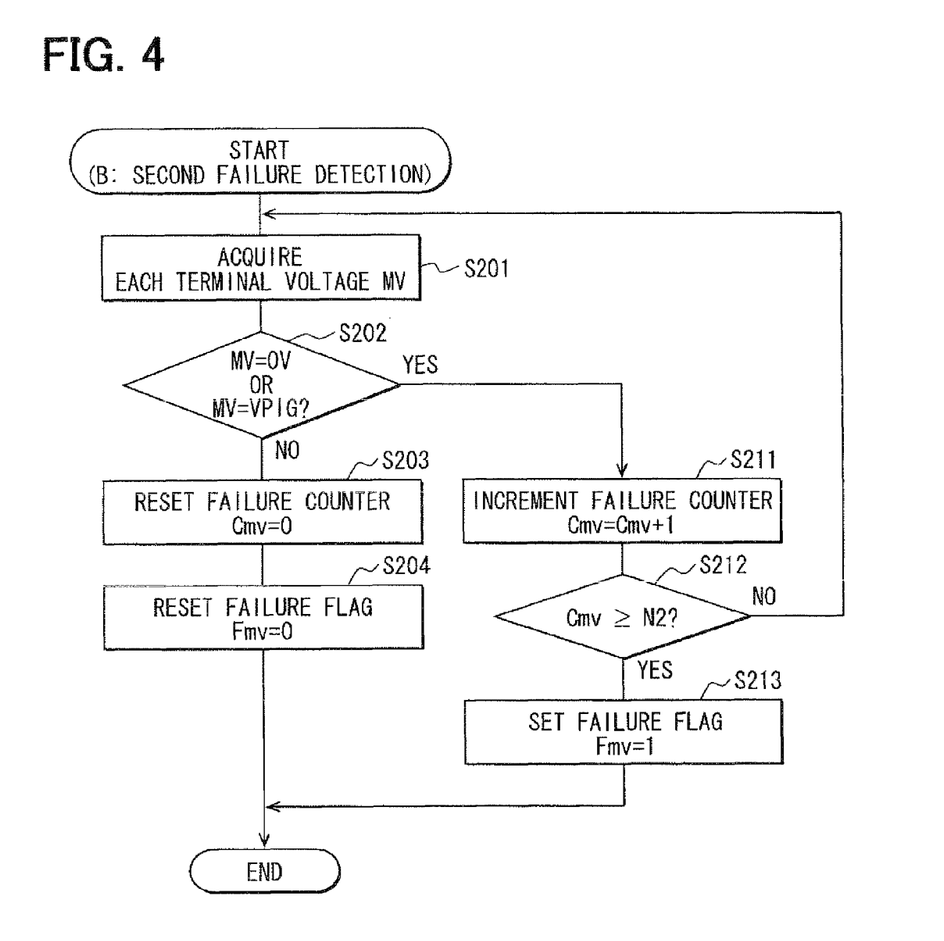
FIG. 4 is a flowchart showing second failure detection processing executed by the motor drive apparatus shown in FIG. 2.

The failure detection processing B is shown as a flowchart in FIG. 4, in which S denotes a step. In this processing B, short-circuit failure of each FET 21 to 26 in the first inverter 20 or short-circuit of each winding 81 to 83 in the first winding set 87 is detected. The short-circuit of each winding 81 to 83 includes direct connection to the first power supply line 71 or to the ground. If the first inverter 20 or the first winding set 87 has short-circuit failure, a large current flows from the power supply voltage side (power supply line 71) to the ground. Therefore, the large current need be prevented from flowing.

Regarding the U-phase, for example, if the U1 coil 81 is short-circuited to the ground or the low-side FET 24, to which the U1 coil 81 is connected, is short-circuited, the U1 terminal voltage MVU1, which is developed at the terminal 27, falls to 0 V. If the U1 coil 81 is short-circuited to the first power supply line 71 or the high-side FET 21 is short-circuited, to which the U1 coil 81 is connected, the U1 terminal voltage MVU1, which is developed at the terminal 27, rises to be equal to or close to the first power supply line output voltage VPIG1. The same situation also arises with respect to the V-phase and the W-phase. If the U1 coil 81, the low-side FET 24 and the high-side FET 21 are all normal, the U1 terminal voltage MVU1 becomes a voltage, which is a division of the first power supply line output voltage VPIG1 by the resistances of the pull-up resistor 65 of the first voltage application part and resistors of the interface circuit 75.

The failure detection processing B therefore detects the failure of the FET 21 to 26 or the coil 81 to 83 by checking the terminal voltage MV of each phase as described above.

Referring to FIG. 4, first at S201, the terminal voltage MV of each phase of the first motor drive part 11, that is, the U1 terminal voltage MVU1, the V1 terminal voltage MVV1 and the W1 terminal voltage MVW1, is acquired. At S202, it is checked whether the acquired each terminal voltage MV is 0V or equivalent to the output voltage VPIG1. If the determination is NO, a failure counter is reset (Cmv=0) at S203 and then S204 is executed. The count Cmv is used to indicate the number of times of determination of the short-circuit failure. The count Cmv thus increases as the short-circuit failure persists. At S204, an inverter or winding failure flag is reset (Fmv=0). Thus, it is determined that the first inverter 20 and the first winding set 87 are normal and have no short-circuit failure.

If the determination at S202 is YES, the failure counter is incremented (Cmv=Cmv+1) at S211 and then S212 is executed. At S212, it is checked whether the count Cmv of the failure counter is equal to or greater than a predetermined count N2. If the determination is NO, the above processing is repeated again from S201. The determination of NO at S212 indicates that the detected failure may be just temporary. Thus erroneous determination is prevented from being caused by accidental change of each terminal voltage VM. If the determination is YES as many as N2 or more times at S202, the check at S212 results in YES. In this case, the failure flag Fmv is set (Fmv=1) to indicate that the first inverter 20 or the first winding set 87 is finally determined to be in failure. After S204 or S213, the failure detection processing B is finished.

Figure 5A:
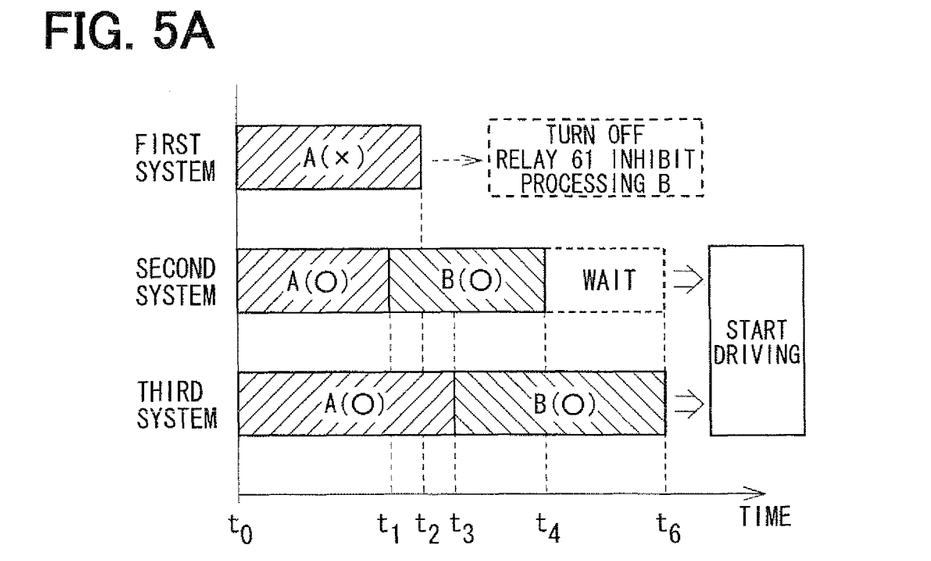
FIGS. 5A and 5B are time charts showing failure detection processing according to a first embodiment and a second embodiment of the present invention, respectively.
Figure 5B:
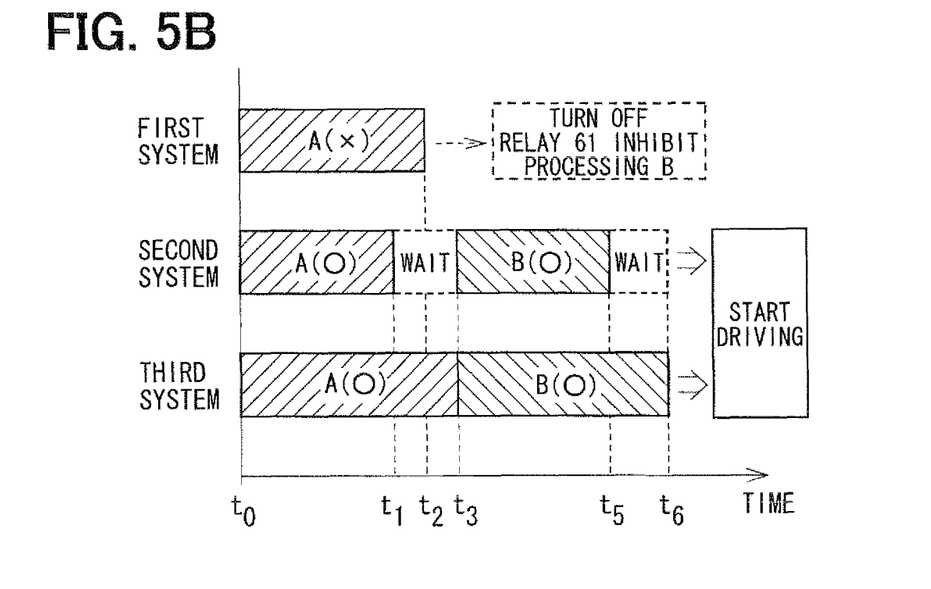

The control unit 50 executes the failure detection processing about each motor drive part before starting to drive the motor 10 as exemplarily shown in FIGS. 5A and 5B.

FIRST EXAMPLE

It is assumed that the motor drive apparatus 1 has three motor drive parts (three motor drive systems) as shown in FIG. 5A. In FIG. 5A, (○) and (x) indicate determination of no-failure and determination of failure in the processing, respectively.

The control unit 50 simultaneously starts the failure detection processing A for all of the first to the third drive systems at time t0. The second drive system is determined to have no failure by the failure detection processing A at time t1, and then the failure detection processing B is executed. The first drive system is determined to have failure by the failure detection processing A at time t2. In this case, the first power supply relay 61 is turned off to interrupt the power supply and execution of the subsequent processing B is inhibited. The third drive system is determined to have no failure by the failure detection processing A at time t3, and then the failure detection processing B is executed. The second drive system is determined to have no failure by the failure detection processing B at time t4. At this time, the failure detection processing B is still in execution with respect to the third drive system. Therefore, the motor 10 is in a wait condition and not yet started. When the third drive system is determined to have no failure by the failure detection processing B at time t6, the power supply to the motor drive parts of the second and the third drive systems is started at the same time so that the motor 10 is started to operate.

In the first example, the first motor drive part 11 of the first drive system determined to be in failure by the failure detection processing A is not used at all because the power supply is interrupted by the first power supply relay 61. The motor 10 is thus driven by only the second and the third drive systems, which are normal. As described above, it is not necessary to perform complicated control such as driving the motor 10 by only normal phases in each drive system after specifying a location (phase) of failure by the motor drive part in the drive system, which is in failure. Further, in the first drive system, which is determined to have failure by the failure detection processing, the other failure detection processing, that is, subsequent processing B, is inhibited from being executed following execution of the failure detection processing B. As a result, the arithmetic processing operation executed by the microcomputer of the control unit 50 is reduced. The motor 10 is thus driven by only the normal drive systems in the motor drive apparatus 1.

Since the motor 10 is started to be driven at the same time by the second and the third drive systems, which have no failure, the rotation torque of the motor 10 provided immediately after starting the motor drive is stabilized. Since driving the motor 10 by one drive system and failure detection processing by the other drive systems are not executed concurrently, a control program to be executed by the microcomputer is simplified and the arithmetic operation processing is reduced. The reliability of the control program is improved and the control unit 50 can be configured by a compact and low cost microcomputer.

SECOND EXAMPLE

The second example shown in FIG. 5B is different from the first example shown in FIG. 5A in respect of the processing executed at time t1 and time t3. The control unit 50 determines at time t1 that the second drive system is normal by the failure detection processing A. Since the failure detection processing A is still under execution with respect to the first drive system and the third drive system, the second drive system and hence the motor 10 is thus in the wait condition (W) and not yet started to operate. Since the failure detection processing B for the first drive system is inhibited, the first drive system is not put in the wait condition. When the third drive system is determined to be normal by the failure detection processing A at time t3, both the second and the third drive systems are subjected to the failure detection processing B at the same time.

At time t5, the second drive system is determined to be normal by the failure detection processing B. The failure detection processing B is still in execution in respect of the third drive system, however, the motor 10 is in the wait condition and not yet started. When the third drive system is determined to be normal by the failure detection processing B at time t6, the power supply to the motor drive parts of the second and the third drive systems is started and the motor 10 is started to operate.

According to the second example, the control unit 50 starts the failure detection processing B after waiting for the termination of the failure detection processing A with respect to both of the second and the third drive systems in addition to the control performed according to the first example. As a result, both of the failure detection processing A and B are not executed at the same. Thus, the control program can be simplified and its execution time can be shortened. The reliability of the program is improved. Since the complicated arithmetic operation is reduced, the control unit 50 can be configured by a compact and inexpensive microcomputer.

OTHER EXAMPLE

Figure 6A:
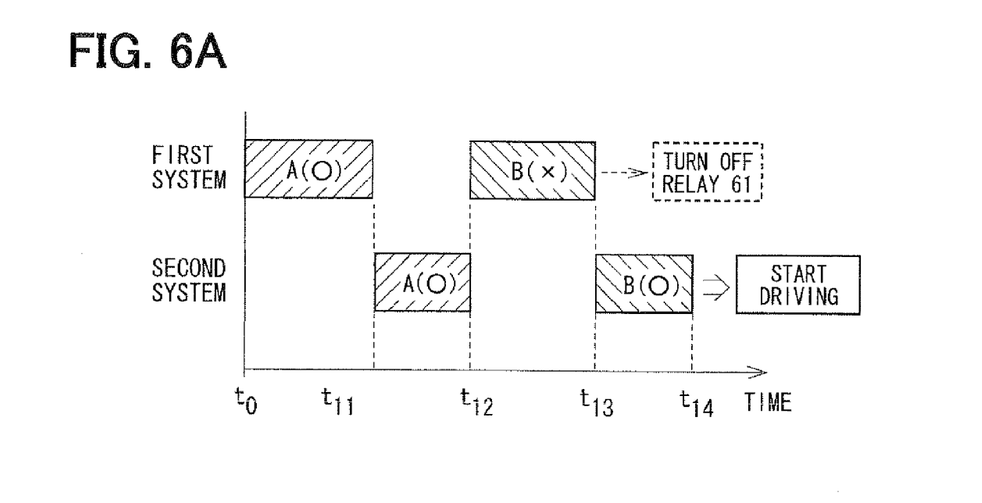
FIGS. 6A and 6B are time charts showing failure detection processing according to further embodiments of the present invention, respectively.

In the first and the second examples, the failure detection processing A and the failure detection processing B of each drive system is executed in parallel among the plurality of drive systems. It is possible to execute each of the failure detection processing A and the failure detection processing B system by system in sequence, that is, in series in the order of the first to the last (for example, second) drive systems. In the example of the two drive systems of the motor drive apparatus 1, as shown in FIG. 6A, the failure detection processing A for the first drive system is started at time t0. The failure detection processing A for the second drive system is started after the first drive system is determined to be normal by the failure detection processing A at time t11. The failure detection processing B for the first drive system is then started after the second drive system is determined to be normal by the failure detection processing A at time t12. If the first drive system is determined to have failure by the failure detection processing B at time t13, the first power supply relay 61 is turned off. Since the failure detection processing B is the last processing to be executed for each drive system, no more failure detection processing need be inhibited. If the failure detection processing B for the second drive system is started and the second drive system is determined to be normal at time t14, the motor 10 is started to operate by only the second drive system after time t4.

Figure 6B:
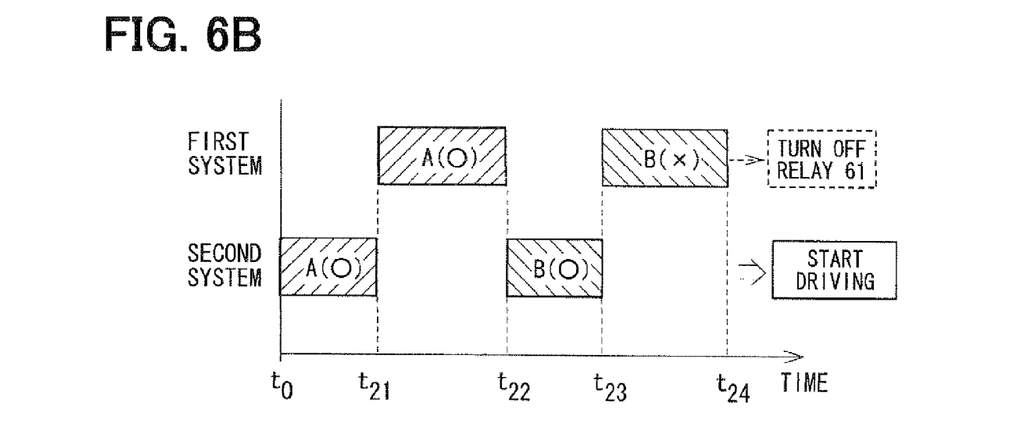

In the example shown in FIG. 6B, each failure detection processing is executed in the opposite order, from the second drive system to the first drive system, in series. In the similar manner as in the example of FIG. 6A, the drive systems to be checked are switched at times t21, t22 and t23. If the first drive system, for which the failure detection processing B is executed last, is determined to be in failure, the first power supply relay 61 is turned off. The motor 10 is started to operate by only the second drive system, which has been determined to be normal at time t23.

The series processing exemplified in FIGS. 6A and 6B takes more time than the parallel processing exemplified in FIGS. 5A and 5B to complete the failure detection processing. However, only one drive system is checked at one time. As a result, the program can be further simplified to improve the reliability of the program.

The present invention is not limited to the disclosed examples but may be implemented differently.

What is claimed is:

1. A motor drive apparatus for a motor driven by electric power supplied from a DC power source, the motor drive apparatus comprising:
a plurality of motor drive parts formed of a plurality of inverters and a plurality of winding sets, respectively, each inverter being for converting the electric power of the DC power source into AC power, and each winding set being for driving the motor with the AC power supplied from the inverter;
a control unit configured to perform a plurality of ("m": integer equal to 2 or more) failure detection processing with respect to each of the plurality of motor drive parts in an order from first to "m"-th failure detection processing before starting to drive the motor, the control unit configured to control power supply to the motor drive part by determining failure or no-failure in the motor drive part by the plurality of failure detection processing; and
a power interruption section provided to supply or interrupt the electric power from the DC power source to the plurality of motor drive parts,
wherein the power interruption section is configured to interrupt, when the control unit determines that a specific one of the motor drive parts has failure, the electric power from being supplied from the DC power source to the specific one of the motor drive parts, and
wherein the control unit is configured to inhibit execution of next one of the plurality of failure detection processing for the specified one of the motor drive parts after determination of the failure.

2. The motor drive apparatus according to claim 1, wherein:
the control unit is configured to start supply of the electric power to the motor drive part, which is determined to have no failure by "m"-th failure detection processing executed for all the motor drive parts except the specified one, after the "m"-th failure detection processing is completed.

3. The motor drive apparatus according to claim 2, wherein:
the control unit is configured to start an "i+1"-th failure detection processing after completion of an "i"-th failure detection processing for all the motor drive parts except the specified one, in respect of which the failure detection processing is inhibited, "i" being an integer equal to or more than "1" and less than "m."

4. The motor drive apparatus according to claim 1, wherein:
the motor is provided in an electric power steering apparatus.

5. The motor drive apparatus according to claim 1, wherein:
the power interruption section is provided between the DC power source and the inverters of the motor drive parts and includes a plurality of power supply relays in correspondence to the motor drive parts, respectively;
the control unit is configured to turn on the power supply relays to perform the failure detection processing with respect to the motor drive parts, respectively; and
the control unit is configured to turn off the power supply relay, which corresponds to the specified one of the motor drive parts.

6. The motor drive apparatus according to claim 5, wherein:
the control unit is configured to perform the failure detection processing based on DC voltages developed by the motor when the power supply relay is turned on.

7. The motor drive apparatus according to claim 6, further comprising:
a capacitor connected between the DC power source and the power supply relays, wherein the control unit is configured to perform the failure detection processing based on a voltage of the capacitor when the power supply relay is turned on.

8. The motor drive apparatus according to claim 1, wherein:
the control unit is configured to perform the failure detection processing before driving the inverters to start conversion of the electric power of the DC power source to the AC power.

* * * * *